United States Patent [19]
Schmid

[11] 3,789,645
[45] Feb. 5, 1974

[54] CONTROL DEVICE FOR THE SLIDING ROOFS OF VEHICLES

[75] Inventor: Alfred Schmid, Edgewater, Md.

[73] Assignee: Webasto-Werk W. Baier KG, Stockdorf, Germany

[22] Filed: July 27, 1972

[21] Appl. No.: 275,718

[30] Foreign Application Priority Data
July 27, 1971 Austria .............................. 6529/71

[52] U.S. Cl............... 74/491, 74/501 R, 296/137 A
[51] Int. Cl................................................ G05g 1/00
[58] Field of Search .......................... 74/491, 501 R; 296/137 A–137 G

[56] References Cited
UNITED STATES PATENTS
3,507,537   4/1970   Kouth et al...................... 296/137 F FOREIGN PATENTS OR APPLICATIONS
986,225   3/1965   Great Britain.................. 296/137 G Primary Examiner—Charles J. Myhre
Assistant Examiner—Frank H. McKenzie, Jr.
Attorney, Agent, or Firm—Leo A. Rosetta et al.

[57] ABSTRACT

A device for stopping the motion of a vehicle sliding roof panel when it reaches the intermediate closed position from one of two opposite open positions, where a moving pivotable catch hook is engaged by a fixed catching pin, thereby de-activating a hook retaining means and allowing the hook to be retracted by a spring when it is disengaged from the catching pin to permit overriding of the closed position.

10 Claims, 12 Drawing Figures

PATENTED FEB 5 1974  3,789,645

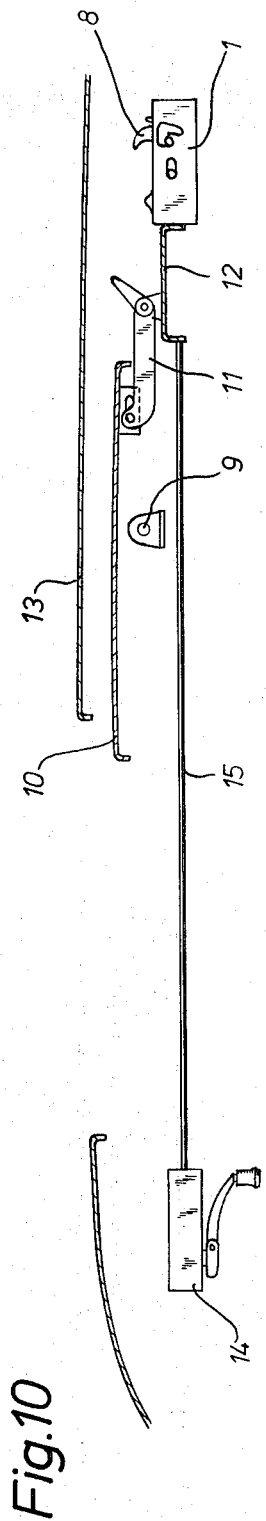
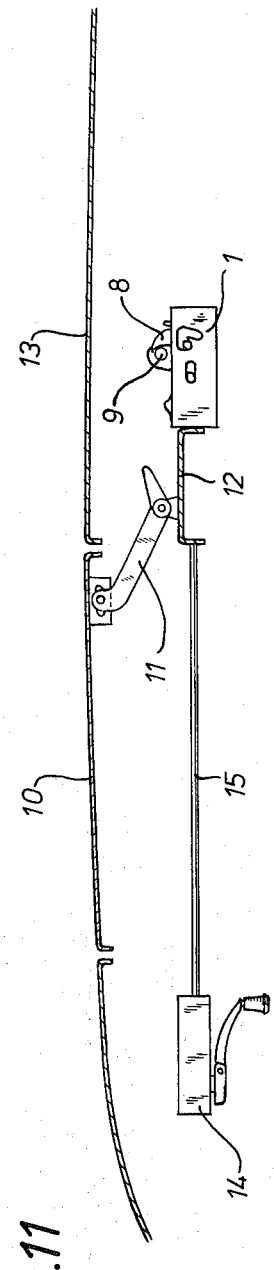
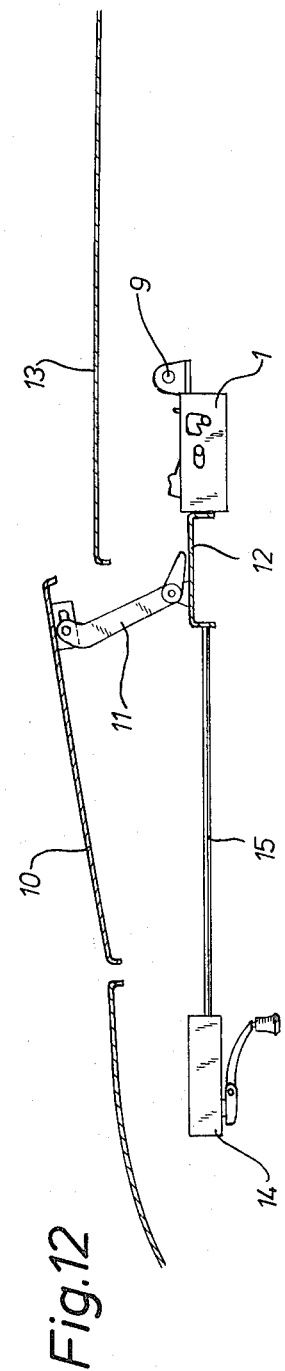
Fig.10
Fig.11
Fig.12

CONTROL DEVICE FOR THE SLIDING ROOFS OF VEHICLES

BACKGROUND OF THE INVENTION

1. Field of the Invention

The invention relates to control devices for the positioning of movable panels, and in particular to control devices for the sliding roof covers of vehicles where the control device determines a closed zero position, allowing a first opening movement in one direction and a second opening movement in the opposite direction.

2. Description of the Prior Art

The prior art includes known mechanisms for the motion control of vehicle sliding roofs which can be opened in two different directions from an intermediate, closed position. An electrically controlled sliding roof system of this kind is disclosed in copending application, Ser. No. 209,613, filed Dec. 20, 1971, now U.S. Pat. No. 3,702,430. This solution involves the use of an electric drive motor and position-responsive switching means which automatically stop the drive when the roof panel reaches its closed position.

SUMMARY OF THE INVENTION

It is a primary object of the invention to provide a simple and robust mechanism for the position control of sliding roof covers which does not require electrical switching means and which is economical to produce.

The invention proposes to attain the above objective by using a control mechanism with a catch lock for the movable part in the region of the zero position, the catch lock being automatically released by the movement of the roof panel. This has the advantage that no separate operating device for the release of the lock is required.

In a preferred embodiment of the invention the releasable lock includes a pivotable catch hook and a catch element, for example, a pin. These two elements move relative to one another in two direction, viz. a catch direction and a release direction. One of the two elements, preferably the catch pin, is stationary, while the catch hook is part of the cable-operated push-pull mechanism which moves the roof panel. The releasable lock further includes release means, preferably a spring, for pivoting the catch hook into and out of the locking position.

In one embodiment of the releasable lock, the pivot pin of the catch hook is slidable in slots. A pivoting movement of the catch hook may conveniently be controlled by a slotted link guide, which according to a further feature of the invention includes an angular slot in which the sliding of the pivot pin of the catch hook causes the latter to perform an upward movement and, on the release of the catch hook, to perform a downward movement. A locking device of the type described can be manufactured in the form of a simple stamping, and because it requires little space can easily be accommodated in a vehicle roof.

According to a further feature of the invention the catch hook is provided with a cam surface which after the release of the lock, pivots the catch hook back into the locking position when the cable is moved in the release direction. In order to return the catch hook to the starting position, one simple arrangement consists in providing a spring device which moves the catch hook into the starting position after being pivoted back into the locking position in the release direction. If it is desired to work not only one control stop, but to provide a stop in each direction of movement, use is made of a different pivotable catch hook which is so disposed that in the region of the zero position it secures a catch member, when the cable is moved in the catch direction. In a preferred embodiment of the feature the two catch hooks are combined in one piece and pivotable about a central pivot pin. In this case it is convenient for the catch hooks to be disposed on the ends of a rocker, which in the center is provided with a slot and a pin slidable therein to serve as a shifting pivot. Use is made of a spring, which acts on the rocker and which, depending on the position of the pin in the slot, urges the rocker device to pivot in one of two different directions.

One application of the device according to the invention is to control the opening and closing, and also outward and return tilting movements, of a sliding cover panel, more especially of the sliding roof of a vehicle, wherein the closed position of the sliding cover is selected as zero position for the control device. In this case it is convenient for the lock to be partly fastened on a part articulated to the sliding cover.

BRIEF DESCRIPTION OF THE DRAWINGS

There will now be described two embodiments of control devices according to the invention, given by way of example, which with the accompanying drawings will suggest still further features and advantages of the invention, wherein:

FIG. 10 shows a schematic cross section of a sliding roof of a vehicle fitted with the device according to the invention, in the open position;

FIG. 11 shows the same in the closed position; and

FIG. 12 shows the roof panel in an upwardly tilted open position.

DESCRIPTION OF THE PREFERRED EMBODIMENTS

Figure 1:
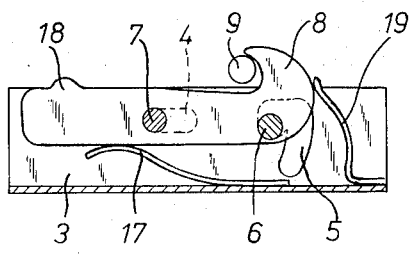
FIG. 1 is a side view of a device according to the invention in the catching position with a side wall removed.
Figures 2, 3:
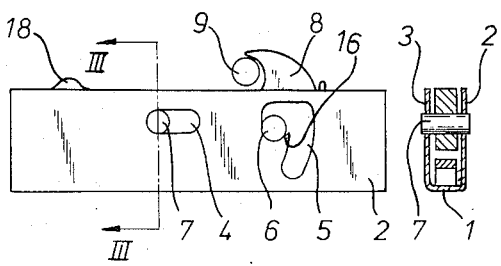
FIG. 2 is a side view of the complete device shown in FIG. 1.
FIG. 3 is a section through FIG. 2 taken along line III—III.
Figure 4:
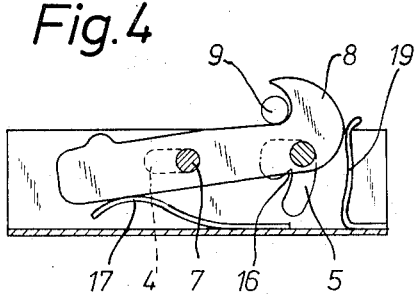
FIG. 4 is a side view of the same device in the locking position.

As can be seen from FIGS. 1–3, a catch device in accordance with the invention comprises a U-shaped frame 1, of which each side plate 2,3 is provided with two slots, which are identified in the plate 3 by the references 4 and 5. A catch hook 8 is held in these slots by means of pins 6,7 engaging the slots 5 and 4, respectively, and slidable therein. The moving hook 8 is shown in FIG. 1 in the catching position in which it just bears against a stationary pin 9, which is spaced from the U-section.

For the functioning of the device it is immaterial whether the pin 9 is fastened on the moving part, and the U-section together with the catch hook is mounted in a fixed position, or whether this section is mounted on the moving part and the pin 9 is mounted in a fixed position as illustrated and described herein. In the application of such a device to the slidable roof cover of a vehicle as illustrated in FIGS. 10–12, the closed position of the sliding cover 10 (FIG. 11) corresponds to the zero position of the device to be controlled. As shown in FIG. 10, the sliding cover can be lowered and moved under a fixed roof part 13 with the aid of a rocking lever 11 mounted on a slide 12. A crank 14 and a push-pull cable 15 serve as drive means, whereby the sliding cover 10 can be returned to the closed position shown in FIG. 11 and also brought into the upward-tilted alternate open position illustrated in FIG. 12 in a known manner.

The device according to the invention is moved, in the example illustrated, by means of the slide 12 on which the U-shaped frame 1 shown in FIGS. 1–7 is mounted, with the hook 8 running up against the pin 9 fastened on the roof frame.

The sliding cover 10 shown in FIGS. 10–12 is movable from the open position shown in FIG. 10 to the closed position, and when the closed position is reached the catch hook 8 engages pin 9 which serves as a catch element. When operation of the crank 14 is continued and consequently the slide 12 and U-section 1 are moved further, catch hook 8 passes from the previously described catching position into the locking position shown in FIG. 4. The catch hook 8 is thereby slightly raised since the slots 4,5 are moved towards the left on the pins 6,7; and a lip 16 of the slot 5 raises the hook 8 from the position in FIG. 2 to that in FIG. 4 by engaging the pin 6. In the position shown in FIG. 4 the pin 6 can slide downward past lip 16 into the lower part of slot 5, allowing hook 8 to be lowered into the horizontal position shown in FIG. 1 under the pressure of a spring 17. Pin 6 is then positioned in the upper portion of the downwardly extending arm of the inverted L-shaped slot, but slightly below the position shown in FIG. 4.

Figure 5:
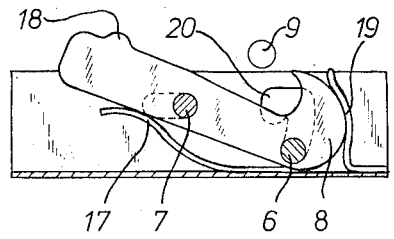
FIG. 5 is a side view of the device in the released position.

When the crank 14 is turned back very slightly, so that the slide 12 together with the U-shaped frame is moved back, the hook 8 is released from the position of engagement against the pin 9 allowing it to pivot downwardly into the release position shown in FIG. 5. The slide 12 and the U-shaped frame 1 can now be moved further in the direction of the crank drive, and the sliding cover 10 is now tilted upwardly into the second open position shown in FIG. 12. A more detailed description of the functioning of the opening, closing and upward-tilting operation is given in German Offenlegungsschrift No. 1,919,479.

As can be seen from the above description, the control device of the invention produces a definite stop action between the closing and upward-tilting operations during the movement of the sliding cover 10, as illustrated, and this stop can be overridden in a simple manner, by briefly turning back the crank 14. No additional operating elements are required for this override action.

Figure 6:
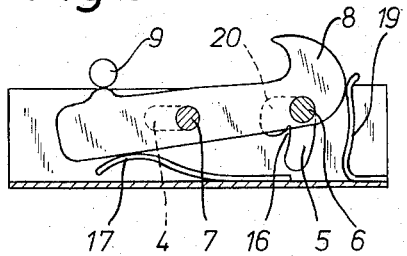
FIG. 6 is another side view with the catch hook in the raised position.
Figure 7:
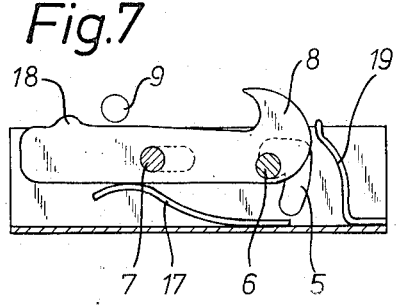
FIG. 7 is a longitudinal sectional view with the catch hook completely set back.

When the slide 12 is moved back beyond the closed position shown in FIG. 11 into the lower open position shown in FIG. 10, the hook 8 is swivelled back by the pin 9 which acts on a cam surface 18 of the hook lever as seen in FIG. 6. As soon as pin 6 reaches a higher position than the lip 16 of the slot 5, hook 8 is pushed backward by the spring 19 into the starting position shown in FIG. 7. If the sliding cover 10 is now again moved forwardly and cam surface 18 passes the pin 9, the hook 8 can yield because of the widened portion 20 of the front portion of the slot 5, and the previously described operation is then repeated.

Figure 8:
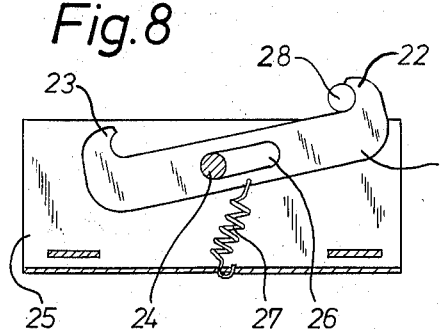
FIG. 8 shows in longitudinal section another form of device in accordance with the invention, in the locking position.
Figure 9:
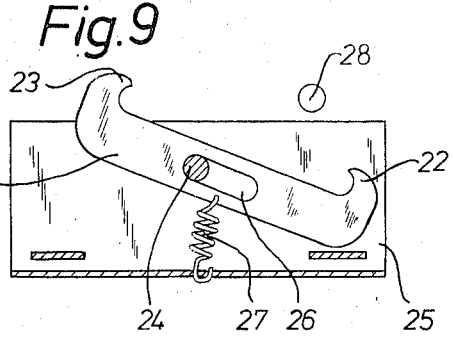
FIG. 9 shows the device of FIG. 8 in the released position.

FIGS. 8 and 9 illustrate another form of control device according to the invention, in which a double catch hook, consisting of a rocker 21, with two hooks 22,23 is mounted in a U-shaped frame 25. Frame 25 includes a fixed pivot pin 24, the double catch hook engaging the pin 24 by means of a pivot slot 26. The slot 26 is located centrally of the rocker 21 and the latter is engaged by a spring 27 fastened on the U-shaped frame 25 under the pin 24, and acts on the rocker 21 of the double hook beneath the mid-point of the slot 26.

In FIG. 8, the device is shown in the first locking position similar to that of FIG. 1. A slight backward movement of frame 25 to the right causes the connection between the hook 22 and a fixed pin 28, which corresponds to the pin 9 of FIG. 1, to be released, allowing the spring 27 to pivot the double catch hook into the second locking position shown in FIG. 9. The U-shaped frame 25 can now be moved to the left without the hook 22 coming against the pin 28. This device, in contrast to the previously described embodiment, provides a further stop during the return movement, when the hook 23, now raised, meets the pin 28. The continuing movement of frame 25 and pin 24 causes a change-over from the catching position to a locking position, in which the pin 24 is moved along the slot 26 to the other end of the slot. Another short backward movement of the carriage releases the hook 23 from the engaging position with pin 28, whereupon the double catch hook is pivoted by the spring 27. In order to obtain safe release of the hooks 22 and 23 from the pin 28 it is preferable to provide a friction action between the double catch and frame 25.

In the embodiment of the device last described, a stop action is obtained not only on changing from the closing movement to the upward-tilting movement of the sliding cover, but also when changing from the return pivoting movement to the opening movement.

A corresponding double stop action can also be obtained by means of two devices according to the first embodiment of the invention described, when the latter are turned 180° in relation to one another.

It should be understood that the invention is not restricted to the details of the embodiments described, but may be modified in various ways without departing from the scope of the invention, as defined in the appended claims.

What is claimed is:

1. A device for controlling the positions of a movable part such as the sliding roof panel of a vehicle comprising in combination:
   reversible drive means for moving the movable part into and out of an intermediate zero position in two directions;

means for blocking the motion of the drive means and movable part, when the movable part reaches the zero position; and means for releasing the blocking means to permit continued movement of the drive means and movable part beyond the zero position, the releasing means responding to a release motion of the drive means.

2. A device as defined in claim 1, wherein the drive means is in the form of a reciprocating push-pull cable operated by a crank.

3. A device as defined in claim 1, wherein the blocking means includes two blocking members, one member being stationary and the other one being movable as a result of being connected to the movable part, the blocking members engaging one another in the zero position of the movable part so as to block the motion of the latter.

4. A device as defined in claim 3, wherein:

one of the blocking members is a pivotable catch hook which moves with the movable part and the other blocking member is a catch element which is stationary.

5. A device as defined in claim 3, wherein:

one of the blocking members is a pivotable rocker arm and the other blocking member is a cooperating catch element, the rocker arm including two oppositely oriented catching hooks on opposite ends thereof which are alternately engageable by the catch element;

the blocking means further includes a frame in which the rocker arm is pivotably mounted, and a transverse pivot pin in the frame for the rocker arm; and the releasing means includes a spring connected to the rocker arm near its midpoint and an elongated pivot hole in the rocker arm extending to both sides of the spring connection, the spring being so arranged that it tends to alternately retract that hook end of the rocker arm which is engaged by the catch element.

6. A device as defined in claim 3, wherein:

one of the blocking members is a pivotable catch hook and the other blocking member is a cooperating catch element.

7. A device as defined in claim 6, wherein:

the pivotable catch hook is movable between a catching position in which it is aligned to engage the catch element and a release position in which the blocking members can move past one another;

the releasing means includes a spring which biases the pivotable catch hook toward the release position and means for retaining the hook in the catching position against the spring bias until the catch element engages and displaces the hook, thereby de-activating the retaining means and releasing the hook to be retracted by the spring, as the hook is disengaged from the catch element in the release motion.

8. A device as defined in claim 7, further including resetting means adapted to return the hook to its catching position in which it is held by the retaining means.

9. A device as defined in claim 7, wherein the pivotable hook includes an elongated body, a hook shape on one extremity thereof, a transverse pivot pin at a distance from the hook shape, and a transverse retaining pin at a distance from the pivot pin; and wherein the blocking means further includes a frame in which the hook is mounted, the pivot pin being displaceable laterally in an elongated hole in the frame, and the retaining pin being displaceable laterally and in the direction of hook pivoting in an inverted L-shaped slot in the frame, the latter slot and the retaining pin being a part of the retaining means.

10. A device as defined in claim 9, wherein the pivotable hook further includes at a distance from the pivot pin opposite the hook shape a cam portion which, when the hook has been pivoted out of its catching position, can be engaged by the catching element to return the hook to the catching position.

* * * * *